(12) United States Patent
Morales

(10) Patent No.: US 11,550,523 B1
(45) Date of Patent: Jan. 10, 2023

(54) HOT FOLDERS WITH BLENDED PRINT TICKETING

(71) Applicant: KYOCERA Document Solutions Inc., Osaka (JP)

(72) Inventor: Javier A. Morales, Rochester, NY (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/516,880

(22) Filed: Nov. 2, 2021

(51) Int. Cl.
G06F 3/12 (2006.01)

(52) U.S. Cl.
CPC .......... *G06F 3/127* (2013.01); *G06F 3/1205* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 8,564,836 B2 | 10/2013 | Hanawa | |
| 2006/0033952 A1* | 2/2006 | Oba | G06F 3/1264 358/1.15 |
| 2012/0327437 A1* | 12/2012 | Hanawa | G06F 3/1285 358/1.9 |
| 2016/0266851 A1 | 9/2016 | Kanamoto | |
| 2018/0239566 A1 | 8/2018 | Kanamoto | |

OTHER PUBLICATIONS

"Creating a PDF Hot Folder on your Desktop" Canon Knowledge Base, Article ID ART129691, May 12, 2015, https://support.usa.canon.com/kb/index?page=content&id=ART129691&cat=2163B002&actp=LIST (accessed and printed on Nov. 2, 2021).
"Direct Print: Printing a File by Copying to the Hot Folder" Konica Minolta. https://manuals.konicaminolta.eu/bizhub-PRESS-C1100-C1085/EN/contents/id19-_101250643.html (accessed and printed on Nov. 2, 2021).
"How to Create Hot Folders: GX Print Server, Version 2.0" Fuji Xerox, http://m1-onlinesupport.fujixerox.com/driver_downloads/HTD/HTD_how_to_create_hot_folders-gxprintserver.pdf, (Accessed and Printed Nov. 2, 2021).
"Mount a Hot Folder Queue at a Computer to Accept Jobs" Article ID x_prodsys_en-Q33806, dated Sept. 1, 2015, printed Feb. 8, 2021.
"Mount a Hot Folder Queue at a Computer to Accept Jobs" Xerox, Sept. 1, 2015 (accessed and printed Feb. 8, 2021).
"Submitting Jobs to a Hot Folder" efi, https://help.efi.com/fieryhotfolders/3.7/en-us/GUID-A642DD57-C3D2-4159-8041-D09CFBF5ECFB.html (Accessed and printed on Nov. 2, 2021.).
"Using Hot Folders" TotalFlow MR, User's Guide, 2012, http://support.ricoh.com/bb_v1oi/pub_e/oi_view/0001044/0001044134/view/users/int/Hot_folder.htm (Accessed and printed Nov. 2, 2021.).

* cited by examiner

*Primary Examiner* — Lennin R Rodriguezgonzalez
(74) *Attorney, Agent, or Firm* — GrowIP Law Group LLC

(57) ABSTRACT

A method is provided that includes receiving, at a hot folder having an associated hot folder print ticket, a submitted print job having an associated submitted print ticket. The associated hot folder print ticket includes at least one hot folder print instruction and the submitted print ticket includes at least one submitted print instruction. The method additionally includes merging the at least one submitted print instruction with the at least one hot folder print instruction to create at least one merged print instruction, which is used to process the print job. Also described are a non-transitory computer-readable medium and a printing device.

20 Claims, 6 Drawing Sheets

HOT FOLDERS WITH BLENDED PRINT TICKETING

FIELD

This disclosure relates to the field of production printing, and, in particular, to using hot folders for submitting print jobs.

BACKGROUND

Hot folders allow clients, e.g., software applications, to print by saving a file to a particular hot folder over a network. Each hot folder may have an associated set of print instructions (e.g., print quantity, media, and finishing), such that by saving the file to the particular hot folder, that hot folder's associated print instructions will be used when printing the file. Some file types, such as postscript files and some other Page Description Language (PDL) file types, allow the client to specify comprehensive print instructions, including print quantity, print media, and print finishing, via embedded print ticketing. However, not all clients are able to write detailed print instructions. In addition, for clients that are able to write detailed print instructions, users of those clients may not know how print jobs should be set up, in order to include such print instructions. Therefore, many less-skilled users might instead save files to hot folders, in order to apply predefined print instructions. In order to provide flexibility in print instructions for multiple jobs in such a scenario, many different hot folders are typically created, each specifying one or more different print quantities, print media, print finishing, or other print instructions. While other solutions exist, such as saving Job Definition Format (JDF) files in hot folders to specify complete print instructions for associated jobs, these solutions do not provide the client with any way to define even minimal print settings, such as print quantity.

Needed are improved systems, apparatus, and methods for providing hot folder functionality with print ticketing capabilities to provide greater flexibility in specifying print instructions on a job-by-job basis.

SUMMARY

One embodiment set forth herein is directed to a method that includes receiving, at a hot folder having an associated hot folder print ticket, a submitted print job having an associated submitted print ticket. The associated hot folder print ticket includes at least one hot folder print instruction and the submitted print ticket includes at least one submitted print instruction. The method additionally includes merging the at least one submitted print instruction with the at least one hot folder print instruction to create at least one merged print instruction, which is used to process the print job.

A second embodiment set forth herein is directed to a non-transitory computer-readable medium having instructions stored therein to cause a processor to perform functions that include (a) receiving, at a hot folder having an associated hot folder print ticket, a submitted print job having an associated submitted print ticket, where the associated hot folder print ticket includes at least one hot folder print instruction and the submitted print ticket includes at least one submitted print instruction, (b) merging the at least one submitted print instruction with the at least one hot folder print instruction to create at least one merged print instruction, and (c) processing the print job using the at least one merged print instruction.

A third embodiment set forth herein is directed to a printing device having a print controller comprising at least one processor and a non-transitory computer-readable medium having instructions stored therein to cause the at least one processor to perform functions on behalf of the printing device. The functions include the following: (a) receiving, at a hot folder having an associated hot folder print ticket, a submitted print job having an associated submitted print ticket, where the associated hot folder print ticket includes at least one hot folder print instruction and the submitted print ticket is in the form of a discrete submitted print ticket, metadata associated with the submitted print job, or a filename associated with the submitted print job, and where the submitted print job includes at least one submitted print instruction, (b) merging the at least one submitted print instruction with the at least one hot folder print instructions to create at least one merged print instruction, and (c) processing the print job using the at least one merged print instruction.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The accompanying drawings are included to provide a further understanding of the systems, apparatus, devices, and/or methods of the disclosure, and are incorporated in and constitute a part of this specification. The drawings are not necessarily to scale, and sizes of various elements may be distorted for clarity and/or illustrated as simplistic representations to promote comprehension. The drawings illustrate one or more embodiments of the disclosure, and together with the description, serve to explain the principles and operation of the disclosure.

DETAILED DESCRIPTION

Example systems, apparatus, devices, and/or methods are described herein. It should be understood that the word "example" is used to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. The aspects described herein are not limited to specific embodiments, apparatus, or configurations, and as such can, of course, vary. It should be readily understood that the aspects of the present disclosure, as generally described herein, and illustrated in the figures, can be arranged, substituted, combined, separated, and designed in a wide variety of different configurations. It is also to be understood that the terminology used herein is for the purpose of describing particular aspects only, and unless specifically defined herein, is not intended to be limiting.

Throughout this specification, unless the context requires otherwise, the words "comprise" and "include" and variations (e.g., "comprises," "comprising," "includes," "including," "has," and "having") will be understood to imply the inclusion of a stated component, feature, element, or step or group of components, features, elements, or steps, but not the exclusion of any other component, feature, element, or step or group of components, features, elements, or steps.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

As used in the specification and the appended claims, the singular forms "a," "an," and "the" include plural referents unless the context clearly dictates otherwise.

Ranges can be expressed herein as from "about" one particular value and/or to "about" another particular value. When such a range is expressed, another aspect includes from the one particular value and/or to the other particular value. Similarly, when values are expressed as approximations by use of the antecedent "about," it will be understood that the particular value forms another aspect. It will be further understood that the endpoints of each of the ranges are significant both in relation to the other endpoint and independently of the other endpoint.

Any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Hot Folders with Blended Print Ticketing

Figure 1:
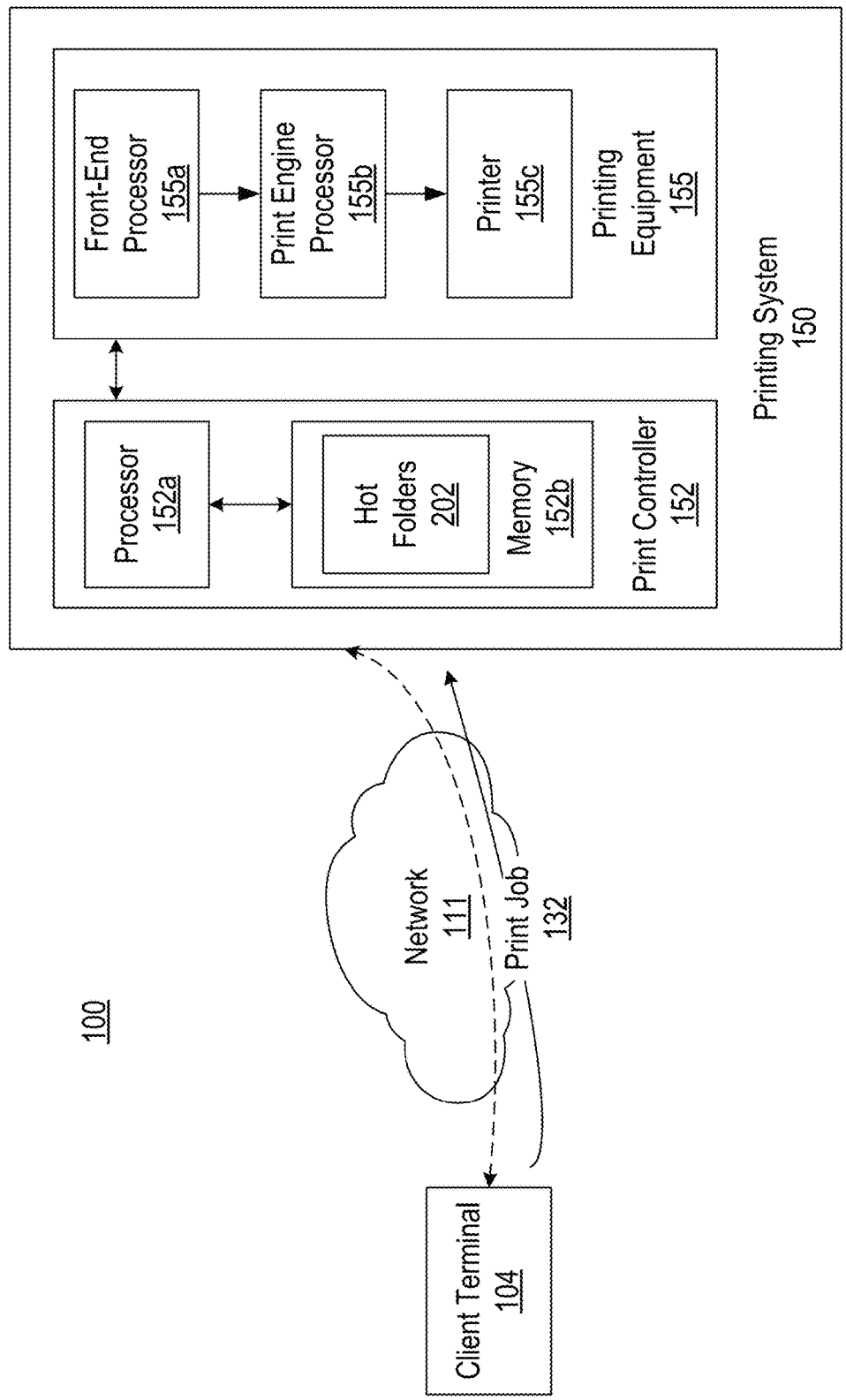
FIG. 1 is a simplified block diagram illustrating an environment that includes various entities that cooperate to facilitate providing hot folders with blended print ticketing functionality, according to an example embodiment.

FIG. 1 is a simplified block diagram illustrating an environment that includes various entities that cooperate to facilitate providing hot folders with blended print ticketing functionality, according to an example embodiment. Example entities of the environment 100 can include a client terminal 104 and a printing system 150. The various entities of the environment 100 can be configured to communicate with one another via a network 111, such as a Local Area Network (LAN), Wide Area Network (WAN), such as the Internet, or another type of wired or wireless network.

The printing system 150 can include a controller 152 and printing equipment 155. In one example, the controller 152 can be configured to coordinate operations performed by the printing equipment 155. For example, the controller 152 can be configured to receive print job requests 132 (also referred to as "print jobs" herein) from entities outside of the printing system 150 and to communicate the print job requests 132 to the printing equipment 155. As described in more detail below, the controller 152 can be further configured to provide functionality to the printing system 150 that allows end users, such as client terminal 104, to utilize hot folders with blended print ticketing functionality for print jobs sent via print job requests 132.

In one example, the printing equipment 155 can include a Front-End Processor (FEP) 155a, a Print Engine Processor (PEP) 155b, and one or more printers 155c. The FEP 155a can be configured to convert bitmap images, vector graphics, fonts, etc., associated with pages specified in the print job request 132 to a bitmap/rasterized representation of the image (e.g., C, M, Y, and K pixels). The manner in which the FEP 155a rasterizes the pages specified in the print job request can depend on various image rasterization parameters of the FEP 155a. For example, these image rasterization parameters may include and/or effect calibration curves, paper definitions, international color consortium profiles (ICC profiles), spot color definitions, tone adjustment curves, color conversion settings, colorant limits (e.g., ink, toner), rendering intent, K preservation, CGR level, etc., max colorant densities, print margin, and/or halftones.

In one example, the PEP 155b can be included or in communication with the printer 155c. The printer 155c can correspond to an industrial printer, for example, such as one capable of printing thousands of pages an hour. In this regard, the printer 155c can be ink-based, toner-based, or can use a different medium. The PEP 155b can include various parameters that can control the operation of the printer 155c, based on print instructions included in or with the print job request 132.

The controller 152 can include a processor 152a and a memory 152b. The controller 152 can include other subsystems, such as an input/output (I/O) subsystem, for example. The processor 152a is in communication with the memory 152b. The processor 152a is configured to execute instruction code stored in the memory 152b. The instruction code facilitates performing, by the controller 152, various functions associated with providing to end users, such as client terminal 104, hot folders with blended print ticketing for print jobs sent via print job requests 132. The memory 152b (or another data storage unit) can also store one or more hot folders 202 to allow clients to print by saving print jobs 132 to particular hot folders 202 over the network 111. Each hot folder 202 may have an associated set of print instructions (e.g., print quantity, media, and finishing), such that by saving the print job 132 to the particular hot folder 202, that hot folder's associated print instructions will be used when printing the print job 132. The processor 152a can correspond to a stand-alone computer system such as an Intel®, AMD®, or ARM® based computer system or a different computer system and can include application-specific computer systems. The computer system can include an operating system, such as Microsoft Windows®, Linux, Unix®, Mac OS®, or a different operating system. In addition, the operations performed by the various subsystems can be combined into a fewer or greater number of subsystems to facilitate speed scaling, cost reductions, etc.

Figure 2:
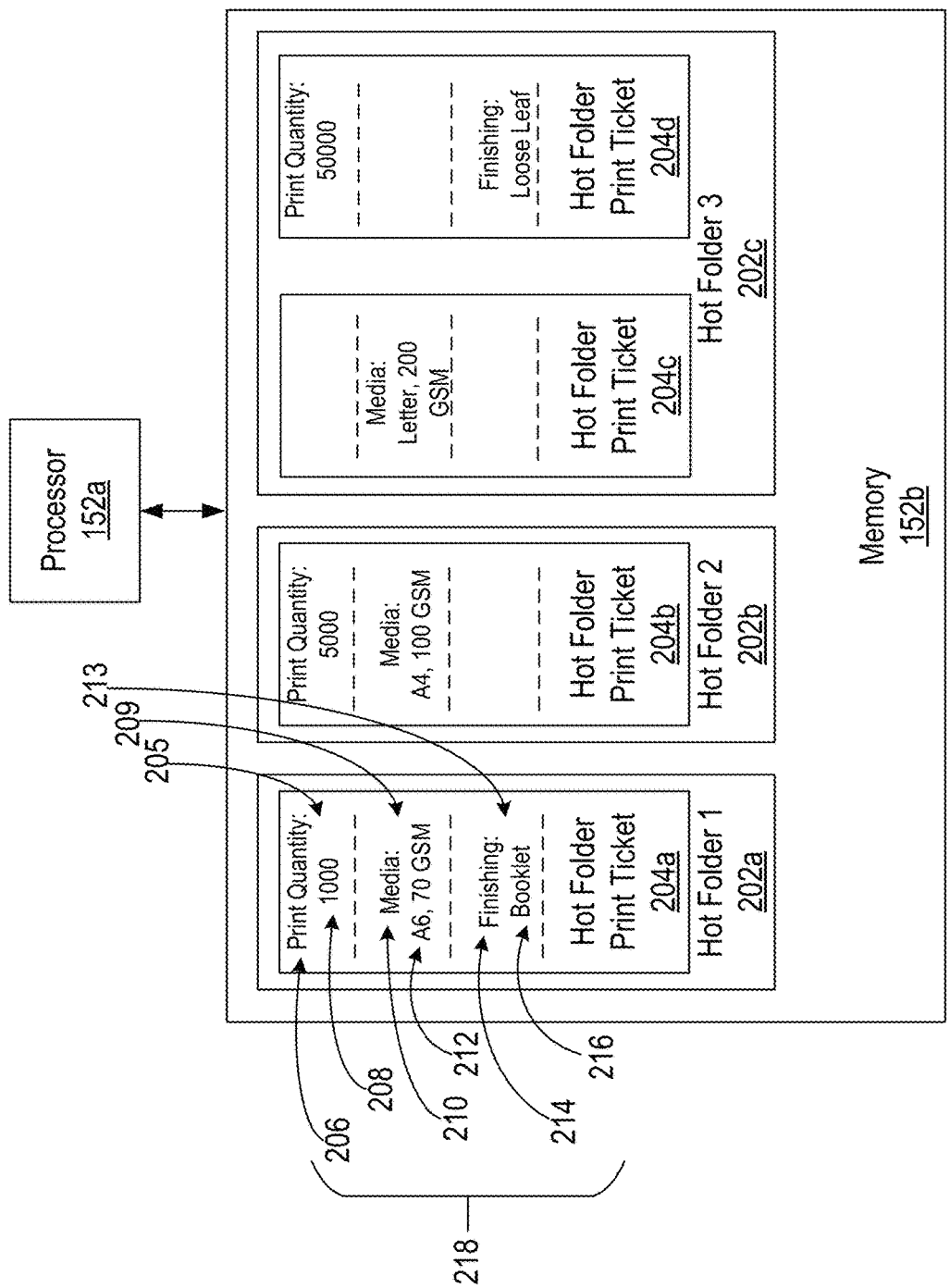
FIG. 2 is a simplified schematic diagram illustrating a plurality of hot folders stored in a memory, according to an example embodiment.

FIG. 2 is a simplified schematic diagram illustrating a plurality of hot folders 202a-202c stored in the memory 152b, according to an example embodiment. The memory 152b may be part of a print controller 152, for example, with the processor 152a executing stored instructions to perform tasks relating to providing hot folders with blended print ticket functionality. The memory (or other associated memories) may have more than the three illustrated hot folders 202a-202c in some examples.

Each of the hot folders 202a, 202b, and 202c may have one or more hot folder print tickets, such as hot folder print tickets 204a-204d associated with it. Alternatively, some hot folders (not pictured) may not include any print tickets. As shown in FIG. 2, hot folder 202a has a hot folder print ticket 204a associated with it, hot folder 202b has a hot folder print ticket 204b associated with it, and hot folder 202c has two hot folder print tickets 204c and 204d associated with it. The hot folder print ticket 204c could have different print instructions than the hot folder print ticket 204d, for example.

Each of the hot folder print tickets 204a-204d may have one or more associated hot folder print instructions. Alternatively, some hot folder print tickets (not pictured) may not include any hot folder print instructions. As shown in FIG. 2, hot folder print ticket 204a has a plurality of hot folder print instructions 218, provided as an illustrative example. The plurality of hot folder print instructions 218 associated with hot folder print ticket 204 includes the following: a "print quantity" print instruction 205, a "media" print instruction 209, and a "finishing" print instruction 213. Each of the hot folder print instructions, in turn, comprises a hot ticket print ticket property and a hot ticket print ticket property value. In the example of FIG. 2, the "print quantity" print instruction 205 includes a "print quantity" property 206 and an associated "print quantity" value 208 of "1000." The "media" print instruction 209 includes a "media" property 210 and an associated "media" value 212 of "A6, 70 GSM." The "finishing" print instruction 213 includes a "finishing" property 214 and an associated "finishing value 216 of "Booklet." The aforementioned print instructions are merely examples, and many other types of print instructions (including print instruction properties and property values) may also be specified and utilized.

Similarly, hot folder print ticket 204b in hot folder 202b has a "print quantity" print instruction with a property value of "5000" and a "media" print instruction with a property value of "A4, 100 GSM." Hot folder print ticket 204c in hot folder 202c has a "media" print instruction with a property value of "Letter, 200 GSM." Hot folder print ticket 204d in hot folder 202c has a "print quantity" print instruction with a property value of "50000" and a "finishing" print instruction with a property value of "Loose Leaf."

Figure 3:
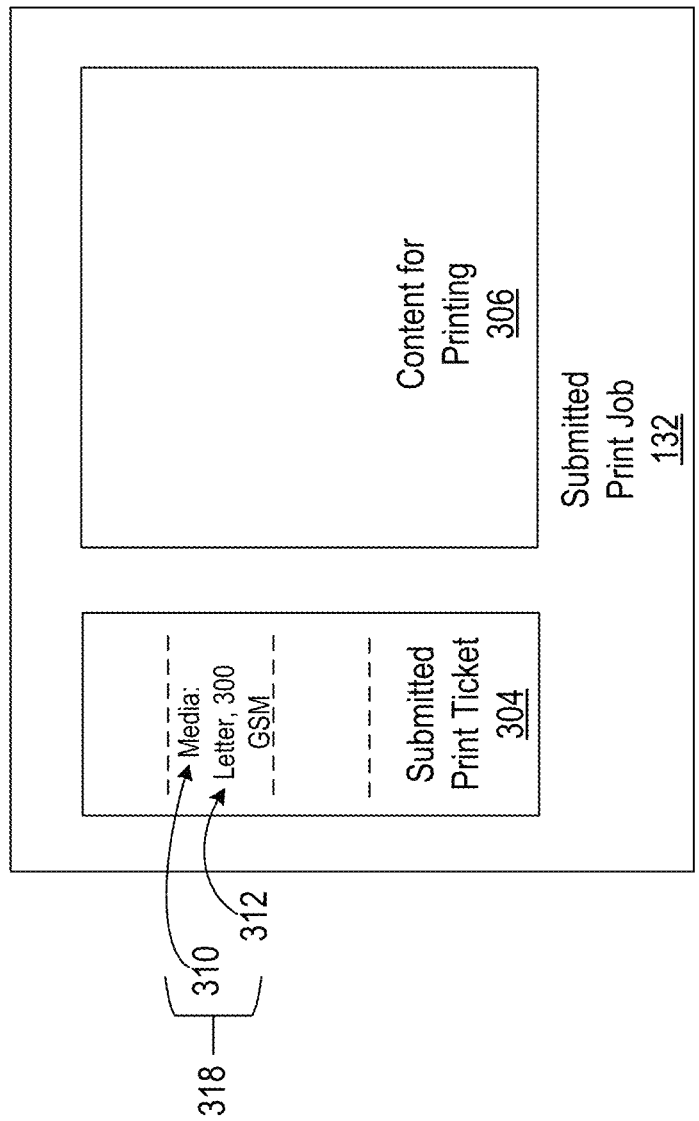
FIG. 3 is a simplified schematic diagram illustrating a submitted print job, according to an example embodiment.

FIG. 3 is a simplified schematic diagram illustrating a submitted print job 132, according to an example embodiment. The submitted print job 132 includes, among possibly other items, a submitted print ticket 304 and content for printing 306.

The submitted print ticket may have associated submitted print instructions. As shown in FIG. 3, submitted print ticket 304 has a "media" submitted print instruction 318, provided as an illustrative example. The "media" submitted print instruction comprises a "media" print ticket property 310 and a "media" print ticket property value 312. The content for printing 306 may include data representing a plurality of bitmap images, vector graphics, characters, fonts, etc.

Figure 4:
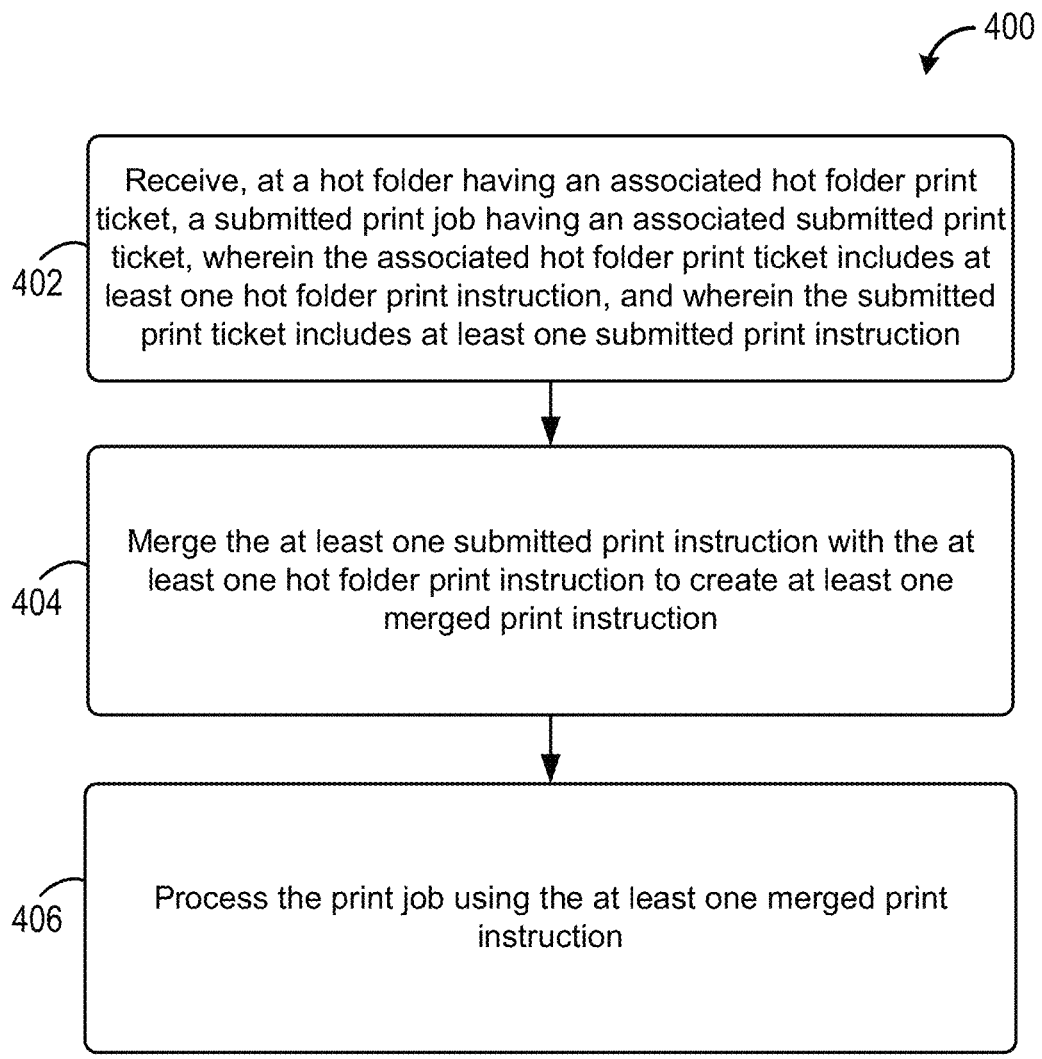
FIG. 4 is a flow diagram illustrating a method for providing a hot folder having blended print ticket functionality, according to a first example embodiment.

FIG. 4 is a flow diagram illustrating a method 400 for providing a hot folder having blended print ticket functionality, according to a first example embodiment. In particular, method 400 may represent a specific sequence or series of actions that, when performed, allows for the provision of hot folders with blended print ticketing. The method 400 and variations (see the examples set forth in the following description) could be a series or plurality of functions performed by a processor executing instructions stored on a non-transitory computer-readable medium, as described with respect to FIG. 7, for example. In another example, the method 400 could be performed at printing device having a print controller with at least one processor and a non-transitory computer-readable medium having instructions stored therein to cause the at least one processor to perform functions associated with the method 400, including variations thereof.

In block 402, the method 400 involves receiving, at a hot folder having an associated hot folder print ticket, a submitted print job having an associated submitted print ticket, wherein the associated hot folder print ticket includes a plurality of hot folder print instructions, and wherein the submitted print ticket includes at least one submitted print instruction. In block 404, the method 400 involves merging the at least one submitted print instruction with the plurality of hot folder print instructions to create at least one merged print instruction. In block 406, the method 400 involves processing the print job using the at least one merged print instruction.

In one example, merging the at least one submitted print instruction with the plurality of hot folder print instructions to create the at least one merged print instruction (block 404) may include duplicating the hot folder print ticket to create a duplicate hot folder print ticket that includes a plurality of duplicate hot folder print instructions, where each of the plurality of duplicate hot folder print instructions is a duplicate of a corresponding one of the plurality of hot folder print instructions. The duplicate hot folder print ticket is associated with the submitted print job, and a determining is made as to whether any of the at least one submitted print instructions specifies a print ticket property that is already specified in the duplicate hot folder print ticket or the hot folder print ticket.

Any and all of the at least one submitted print instructions that specify a print ticket property that is not already specified in the duplicate hot folder print ticket or the hot folder print ticket are added to the duplicate hot folder print ticket to create a blended print ticket. Upon determining that at least one submitted print instruction specifies a print property that is already specified in the duplicate hot folder print ticket or the hot folder print ticket, the method 400 can include replacing, in the duplicate hot folder print ticket, with the determined at least one submitted print instruction, all of the plurality of duplicate hot folder print instructions already specifying a print ticket property specified by the determined at least one submitted print instruction. Such a replacement might be made, for example, only if the print ticket property values differ between the duplicate hot folder print instruction(s) and the submitted print instruction(s). Or, the replacement may always be made, without a further comparison between print ticket property values. The replacing could simply comprise replacing print property values for all of the plurality of duplicate hot folder print instructions already specifying a print ticket property specified by the determined at least one submitted print instruction. Alternatively, entire print instructions (rather than just print property values) could be replaced.

In one example, processing the print job using the at least one merged print instruction (block 406) involves applying the at least one merged print instruction from the duplicate hot folder print ticket to the print job and printing the submitted print job according to the at least one merged print instruction.

In some examples, the method 400 could further include creating the hot folder print ticket associated with the hot folder by (1) receiving, from a user via a user interface, the hot folder print instructions, (2) receiving, from the user via a configuration user interface, such as a drag-and-drop graphical user interface showing folders and associated print instruction icons on a display screen, an association between the hot folder print instructions and the hot folder, and (3) saving, in or associated with the hot folder, the hot folder print instructions in the hot folder print ticket. To initiate creation of the hot folder, the method 400 could additionally include receiving a definition to create the hot folder.

For print jobs not having an associated submitted print ticket, the method 400 could include receiving, at a hot folder having an associated hot folder print ticket, a submitted print job not having an associated submitted print ticket and processing the print job using the at least one hot folder print instruction from the associated hot folder print ticket. In other words, print jobs not having an associated submitted print ticket will be printed according to the hot folder print instructions.

In some examples, the submitted print ticket associated with the submitted print job is in the form of metadata associated with the print job. For example, the metadata could describe the at least one submitted print instruction. The metadata could be from the typical specified PDF metadata (e.g., Title, Author, Subject, Keywords). Alternatively, the PDF metadata may contain a Job Definition Format (JDF) file, which serves as the submitted print ticket to be blended with the hot folder JDF file (i.e., serving as a kind of hot folder print ticket). Where the submitted print ticket is in form of metadata, the method 400 could further include extracting the at least one submitted print instruction from the metadata associated with the print job. Extracting the at least one submitted print instruction from the metadata could include a processor applying a regular expression to the metadata associated with the print job, for example. Such an expression could be in the form of an if-then operation, for example.

In some examples, the submitted print ticket associated with the submitted print job is in the form of a filename associated with the print job. For example, the metadata could be a filename describing (e.g., constituting, at least in part) the at least one submitted print instruction, such as quality, media, or finishing. Where the submitted print ticket is in the form of a filename associated with the submitted print job, the method 400 could further comprise extracting the at least one submitted print instruction from the filename associated with the print job. Extracting the at least one submitted print instruction from the filename could include a processor applying a regular expression to the filename associated with the print job. For example, the filename may be "This is My Job -20-.pdf". The regular expression applied by the processor may be configured to result in a search for -<n digits>- and use that as the print quantity.

In some examples, such as where a particular hot folder includes more than one hot folder print ticket (e.g., the hot folder 202c of FIG. 2, which includes hot folder print ticket 204c and hot folder print ticket 204d), the filename or metadata described above specifies a selection between a first hot folder print ticket and a second-hot folder print ticket. Rules could be configured to select between multiple print tickets based on information extracted from the filename or the metadata. For example, a hot folder may be configured with two print tickets—one for booklets and one for loose sheet printing. If a processor applying the rules to information extracted from a submitted print job finds the word "booklet" in the metadata, then a booklet-related hot folder print ticket could be applied to the submitted print job. Otherwise, according to the example rule, the submitted print job could be processed for printing without finishing. The rules may be used to either select between complete print tickets or to add specific settings to the print ticket, according to various examples.

In all of the above cases, once the metadata has been evaluated and print instructions have been ascertained, the resultant print instructions are blended into the ticket that is submitted to the hot folder.

Figure 5:
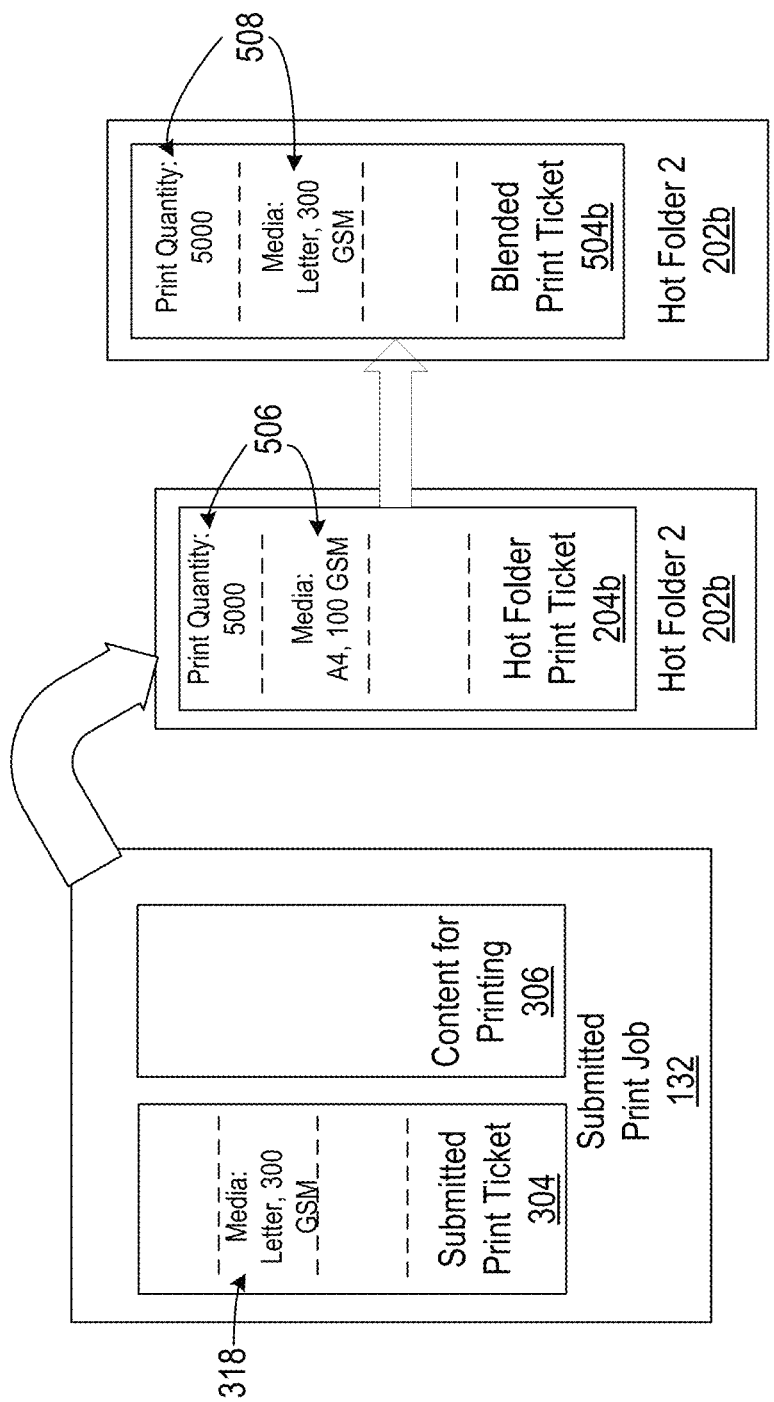
FIG. 5 is a simplified schematic diagram illustrating a blended print ticket created from a submitted print ticket as part of a print job submitted to a hot folder, according to an example embodiment

FIG. 5 is a simplified schematic diagram illustrating an example blended print ticket 504b created from submitted print ticket 304 (see FIG. 3) as part of submitted print job 132 submitted to hot folder 202b (see FIG. 2), according to an example embodiment. The hot folder 202b is the same as is illustrated in FIG. 2 and has the same hot folder print ticket 204b as is illustrated in FIG. 2. Likewise, the submitted print job 132 is the same as is illustrated in FIG. 3 and has the same submitted print ticket 304 as is illustrated in FIG. 3. As described with respect to FIGS. 2 and 3, the hot folder print ticket 204b and the submitted print ticket 304 each include at least one submitted print instruction.

In accordance with the method 400, the submitted print job 132 is received at (e.g., saved by a user or client application) at the hot folder 202b. The submitted print instruction 318 (see FIG. 3) is merged with the hot folder print instructions 506 to create merged print instructions 508 in the blended print ticket 504b, which are then used to process the submitted print job 132. As can be seen in FIG. 5, the blended print ticket 504b includes the "print quantity: 5000" portion of the hot ticket print instruction 506 and the "media: letter, 300 GSM" portion of the submitted print job 132.

As discussed above, merging the submitted print instruction 318 with the hot folder print instructions 506 could include duplicating the hot folder print ticket 204b to create a duplicate hot folder print ticket (i.e., a precursor to the blended print ticket 504b) that includes a plurality of duplicate hot folder print instructions, where each of the plurality of duplicate hot folder print instructions is a duplicate of a corresponding one of the plurality of hot folder print instructions 506. The duplicate hot folder print ticket is associated with the submitted print job 132, and a determining is made as to whether any of the at least one submitted print instructions 318 specifies a print ticket property that is already specified in the duplicate hot folder print ticket or the hot folder print ticket 202b, both of which should contain the same print instructions at that time.

Then, according to at least one example, since the submitted print instruction 318 specifies a print ticket property that is already specified in the hot folder print ticket 204b (or in the duplicate hot folder print ticket 204b), the submitted print instruction 318 replaces, in the duplicate hot folder print ticket, the duplicate hot folder print instruction that already specifies a print ticket property specified by the determined at least one submitted print instruction 318. As can be seen in FIG. 5, the blended print ticket 504b includes the "media: letter, 300 GSM" print instruction from the submitted print ticket 304, rather than the "media: A4, 100 GSM" print instruction from the hot folder print ticket 204b. As was described above, the entire print instruction at issue could be replaced (e.g., overwritten) or, alternatively, only the print ticket property value could be replaced (e.g., overwritten).

The above-proposed implementations of hot folders with blended print ticketing effectively split the difference between simple hot folder submission and complex print ticket creation. This allows clients to specify select parameters (e.g., copies or media attributes (e.g., size, weight, color) while allowing the hot folder to only define more complex print instructions (e.g., finishing or rendering instructions). Example embodiments address at least some of the following existing problems with hot folders: (1) every submitted job can have a different print quantity without requiring that clients specify all print instructions; (2) hot folder management is simplified since a user can, for example, specify media in the client rather than create numerous hot folders (i.e., one hot folder for each paper in the printer's catalog); and (3) full print ticketing is provided while allowing a production print shop to build minimal print ticketing functionality in its clients.

In addition to the above, the ability to extract print information in a flexible manner removes additional barriers to integration. Content management systems can readily add PDF metadata, even if such systems do not have the ability to generate XML print instructions.

Furthermore, by enabling the use of rules, the need for the client to understand the print ticketing for the printer is eliminated. This further removes barriers to integration.

Figure 6:
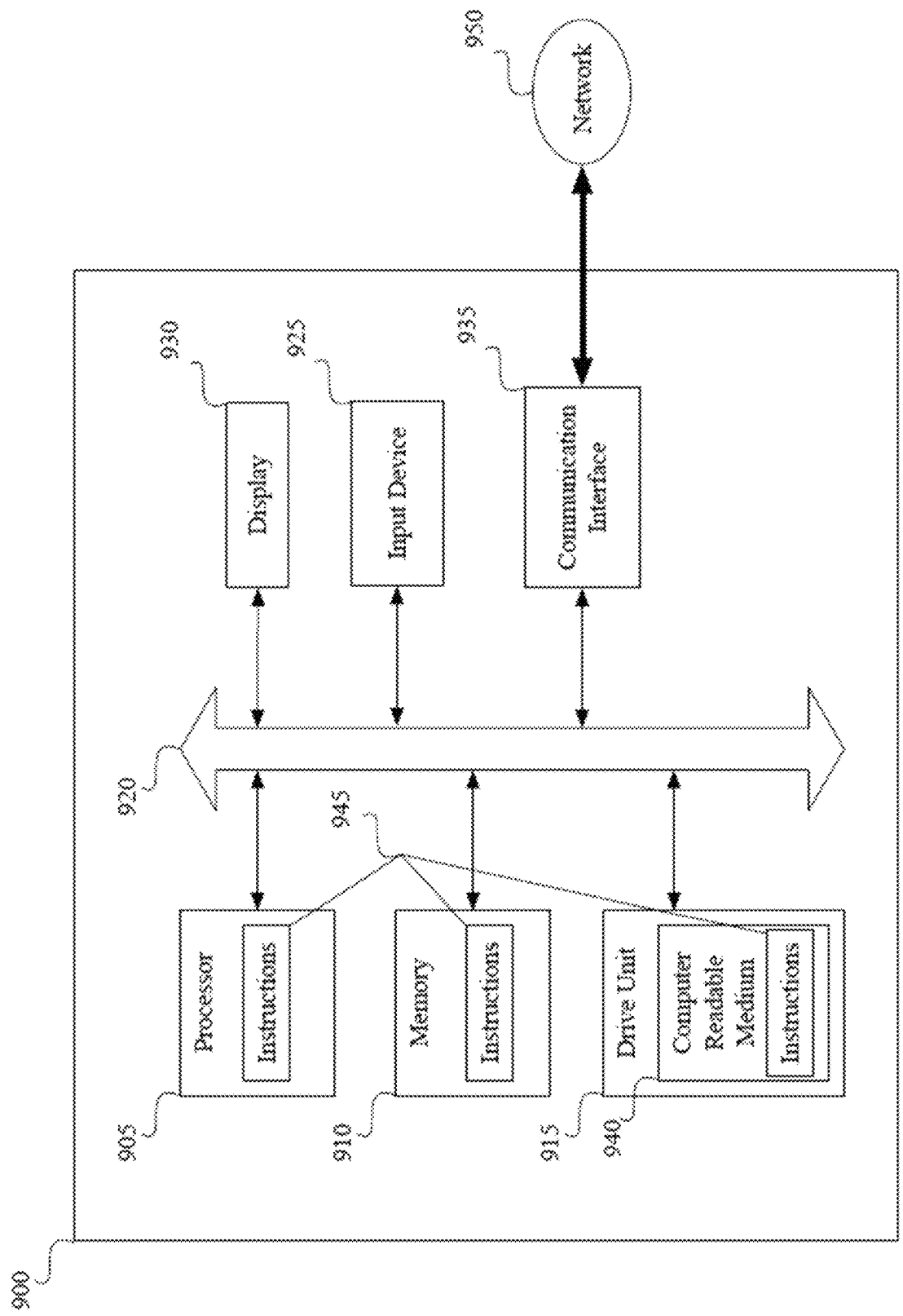
FIG. 6 is a simplified block diagram illustrating an example computer system that may be utilized in one or more example embodiments.

FIG. 6 is a simplified block diagram illustrating an example computer system 900 that may be utilized in one or more example embodiments. The computer system 900 can form part of or implement any of the systems and/or devices described above. The computer system 900 can include a set of instructions 945 that the processor 905 can execute to cause the computer system 900 to perform any of the operations described above. The computer system 900 can operate as a stand-alone device or can be connected, e.g., using a network, to other computer systems or peripheral devices, for example.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, a hard disk drive, or any other type of memory or storage device.

The computer system 900 can include a display 930, such as a light-emitting diode (LED) display, liquid crystal display (LCD), a cathode ray tube (CRT), or any other display suitable for conveying information. The display 930 can act as an interface for the user to see processing results produced by processor 905.

Additionally, the computer system 900 can include an input device 925, such as a keyboard or mouse or touch-screen, configured to allow a user to interact with components of system 900.

The computer system 900 can also include a disk or optical drive unit 915. The drive unit 915 can include a computer-readable medium 940 in which the instructions 945 can be stored. The instructions 945 can reside completely, or at least partially, within the memory 910 and/or within the processor 905 during execution by the computer system 900. The memory 910 and the processor 905 also can include computer-readable media as discussed above.

The computer system 900 can include a communication interface 935 to support communications via a network 950. The network 950 can include wired networks, wireless networks, or combinations thereof. The communication interface 935 can enable communications via any number of communication standards, such as 802.11, 802.12, 802.20, WiMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation. Such a computer program may be stored as instructions in a non-transitory computer-readable medium, for example.

II. Conclusion

The above detailed description sets forth various features and operations of the disclosed systems, apparatus, devices, and/or methods with reference to the accompanying figures. The example embodiments described herein and in the figures are not meant to be limiting, with the true scope being indicated by the following claims. Many modifications and variations can be made without departing from its scope, as will be apparent to those skilled in the art. Functionally equivalent systems, apparatus, devices, and/or methods within the scope of the disclosure, in addition to those described herein, will be apparent to those skilled in the art from the foregoing descriptions. It will be readily understood that the aspects of the present disclosure, as generally described herein, and illustrated in the figures, can be arranged, substituted, combined, separated, and designed in a wide variety of different configurations. Such modifications and variations are intended to fall within the scope of the appended claims. Finally, all publications, patents, and patent applications cited herein are hereby incorporated herein by reference for all purposes.

The invention claimed is:

1. A method, comprising:
   receiving, at a hot folder having an associated hot folder print ticket, a submitted print job having an associated submitted print ticket, wherein the associated hot folder print ticket includes at least one hot folder print instruction, and wherein the submitted print ticket includes at least one submitted print instruction;
   merging the at least one submitted print instruction with the at least one hot folder print instruction to create at least one merged print instruction; and processing the print job using the at least one merged print instruction.

2. The method of claim 1, wherein merging the at least one submitted print instruction with the at least one hot folder print instruction to create the at least one merged print instruction further comprises:
   duplicating the hot folder print ticket to create a duplicate hot folder print ticket that includes at least one duplicate hot folder print instruction, each of the at least one duplicate hot folder print instruction being a duplicate of a corresponding one of the at least one hot folder print instruction;
   associating the duplicate hot folder print ticket with the submitted print job; and
   determining whether any of the at least one submitted print instructions specifies a print ticket property that is already specified in the duplicate hot folder print ticket or the hot folder print ticket.

3. The method of claim 2, further comprising adding, to the duplicate hot folder print ticket, all of the at least one submitted print instructions specifying a print ticket property that is not already specified in the duplicate hot folder print ticket or the hot folder print ticket.

4. The method of claim 2, further comprising, upon determining that at least one submitted print instruction specifies a print ticket property that is already specified in the duplicate hot folder print ticket or the hot folder print ticket:
   replacing, in the duplicate hot folder print ticket, with the determined at least one submitted print instruction, all of the at least one duplicate hot folder print instructions already specifying a print ticket property specified by the determined at least one submitted print instruction.

5. The method of claim 2, wherein processing the print job using the at least one merged print instruction comprises:
   applying the at least one merged print instruction from the duplicate hot folder print ticket to the print job; and
   printing the submitted print job according to the at least one merged print instruction.

6. The method of claim 1, further comprising:
   receiving, at a hot folder having an associated hot folder print ticket, a submitted print job not having an associated submitted print ticket; and
   processing the print job using the at least one hot folder print instruction from the associated hot folder print ticket.

7. The method of claim 1, wherein the submitted print ticket associated with the submitted print job is in the form of metadata associated with the print job, and wherein the metadata describes the at least one submitted print instruction, the method further comprising:
   extracting the at least one submitted print instruction from the metadata associated with the print job.

8. The method of claim 1, wherein the submitted print ticket associated with the submitted print job is in the form of a filename associated with the print job, and wherein the metadata describes the at least one submitted print instruction, the method further comprising:
   extracting the at least one submitted print instruction from the filename associated with the print job.

9. A non-transitory computer-readable medium having instructions stored therein to cause a processor to perform functions comprising:
   receiving, at a hot folder having an associated hot folder print ticket, a submitted print job having an associated submitted print ticket, wherein the associated hot folder print ticket includes at least one hot folder print instruction, and wherein the submitted print ticket includes at least one submitted print instruction;
   merging the at least one submitted print instruction with the at least one hot folder print instruction to create at least one merged print instruction; and
   processing the print job using the at least one merged print instruction.

10. The non-transitory computer-readable medium of claim 9, wherein merging the at least one submitted print instruction with the at least one hot folder print instruction to create the at least one merged print instruction further comprises:
    duplicating the hot folder print ticket to create a duplicate hot folder print ticket that includes at least one duplicate hot folder print instruction, each of the at least one duplicate hot folder print instructions being a duplicate of a corresponding one of the at least one hot folder print instructions;
    associating the duplicate hot folder print ticket with the submitted print job; and
    determining whether any of the at least one submitted print instructions specifies a print ticket property that is already specified in the duplicate hot folder print ticket or the hot folder print ticket.

11. The non-transitory computer-readable medium of claim 10, wherein the functions further comprise adding, to the duplicate hot folder print ticket, all of the at least one submitted print instructions specifying a print ticket property that is not already specified in the duplicate hot folder print ticket or the hot folder print ticket.

12. The non-transitory computer-readable medium of claim 10, wherein the functions further comprise, upon determining that at least one submitted print instruction specifies a print property that is already specified in the duplicate hot folder print ticket or the hot folder print ticket:
    replacing, in the duplicate hot folder print ticket, with the determined at least one submitted print instruction, all of the at least one duplicate hot folder print instructions already specifying a print ticket property specified by the determined at least one submitted print instruction.

13. The non-transitory computer-readable medium of claim 10, wherein processing the print job using the at least one merged print instruction comprises:
    applying the at least one merged print instruction from the duplicate hot folder print ticket to the print job; and
    printing the submitted print job according to the at least one merged print instruction.

14. The non-transitory computer-readable medium of claim 9, wherein the functions further comprise:
    receiving, at a hot folder having an associated hot folder print ticket, a submitted print job not having an associated submitted print ticket; and
    processing the print job using the at least one hot folder print instruction from the associated hot folder print ticket.

15. The non-transitory computer-readable medium of claim 9, wherein the submitted print ticket associated with the submitted print job is in the form of metadata associated with the print job, and wherein the metadata describes the at least one submitted print instruction, the functions further comprising:
    extracting the at least one submitted print instruction from the metadata associated with the print job.

16. The non-transitory computer-readable medium of claim 9, wherein the submitted print ticket associated with the submitted print job is in the form of a filename associated with the print job, and wherein the metadata describes the at least one submitted print instruction, the functions further comprising:

extracting the at least one submitted print instruction from the filename associated with the print job.

17. A printing device comprising:

a print controller comprising at least one processor; and a non-transitory computer-readable medium having instructions stored therein to cause the at least one processor to perform functions on behalf of the printing device, the functions comprising:

receiving, at a hot folder having an associated hot folder print ticket, a submitted print job having an associated submitted print ticket, wherein the associated hot folder print ticket includes at least one hot folder print instruction, and wherein the submitted print ticket is in the form of a discrete submitted print ticket, metadata associated with the submitted print job, or a filename associated with the submitted print job, and wherein the submitted print job includes at least one submitted print instruction;

merging the at least one submitted print instruction with the at least one hot folder print instruction to create at least one merged print instruction; and processing the print job using the at least one merged print instruction.

18. The printing device of claim 17, wherein the functions further comprise extracting the at least one submitted print instruction from the metadata associated with the submitted print job or the filename associated with the submitted print job.

19. The printing device of claim 18, wherein the extracting comprises a regular expression to the metadata associated with the submitted print job or the filename associated with the submitted print job.

20. The printing device of claim 17, wherein the metadata associated with the submitted print job or the filename associated with the submitted print job specifies a selection between a first hot folder print ticket and a second-hot folder print ticket, the first hot folder print ticket having different hot folder print instructions from the second hot folder print ticket, and wherein the associated hot folder print ticket is based on the selection specified by the metadata associated with the submitted print job or the filename associated with the submitted print job.

\* \* \* \* \*